United States Patent
Haren et al.

(12)
(10) Patent No.: US 6,961,837 B2
(45) Date of Patent: Nov. 1, 2005

(54) METHOD AND APPARATUS FOR ADDRESS TRANSLATION PRE-FETCH

(75) Inventors: Ken C. Haren, Portland, OR (US); Lee Albion, Portland, OR (US); Brian M. Leitner, Hillsboro, OR (US); Dominic J. Gasbarro, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 311 days.

(21) Appl. No.: 10/396,585

(22) Filed: Mar. 25, 2003

(65) Prior Publication Data

US 2004/0193830 A1   Sep. 30, 2004

(51) Int. Cl.[7] .............................................. G06F 12/10
(52) U.S. Cl. ...................... 711/202; 711/204; 711/213; 710/52; 710/56
(58) Field of Search ........................ 711/137, 202, 203, 711/204, 213; 710/22, 52, 56

(56) References Cited

U.S. PATENT DOCUMENTS

| 5,278,963 | A  | * | 1/1994  | Hattersley et al. .......... 711/204 |
| 6,611,883 | B1 | * | 8/2003  | Avery .......................... 710/22 |
| 6,742,075 | B1 | * | 5/2004  | Bailey et al. ................ 710/310 |
| 6,789,143 | B2 | * | 9/2004  | Craddock et al. ............. 710/54 |
| 6,813,653 | B2 | * | 11/2004 | Avery .......................... 710/22 |
| 6,831,916 | B1 | * | 12/2004 | Parthasarathy et al. ..... 370/359 |

* cited by examiner

Primary Examiner—Gary Portka
Assistant Examiner—Jasmine Song
(74) Attorney, Agent, or Firm—Buckley, Maschoff & Talwalkar LLC

(57) ABSTRACT

An end of a queue or a page-crossing within a queue is detected. A virtual memory address for the head of the queue or for the next queue page is pre-translated into a physical memory address while the last entry in the queue or in the current queue page is being serviced.

15 Claims, 8 Drawing Sheets

METHOD AND APPARATUS FOR ADDRESS TRANSLATION PRE-FETCH

BACKGROUND

It may be desirable to employ virtual addressing for queues maintained in a network processor to allow for extensive blocks of contiguous address space. Also, if the same virtual memory scheme can be used in the network processor and in a host with which the network processor is associated, overhead in the system may be reduced. However, the physical memory allocated to a queue may be discontinuous, so that translations of a virtual memory page address to a physical memory page address may be required at page crossings or at the end of the queue. Such address translations may entail significant latency and disadvantageous delays in queue processing.

DETAILED DESCRIPTION

Figure 1:
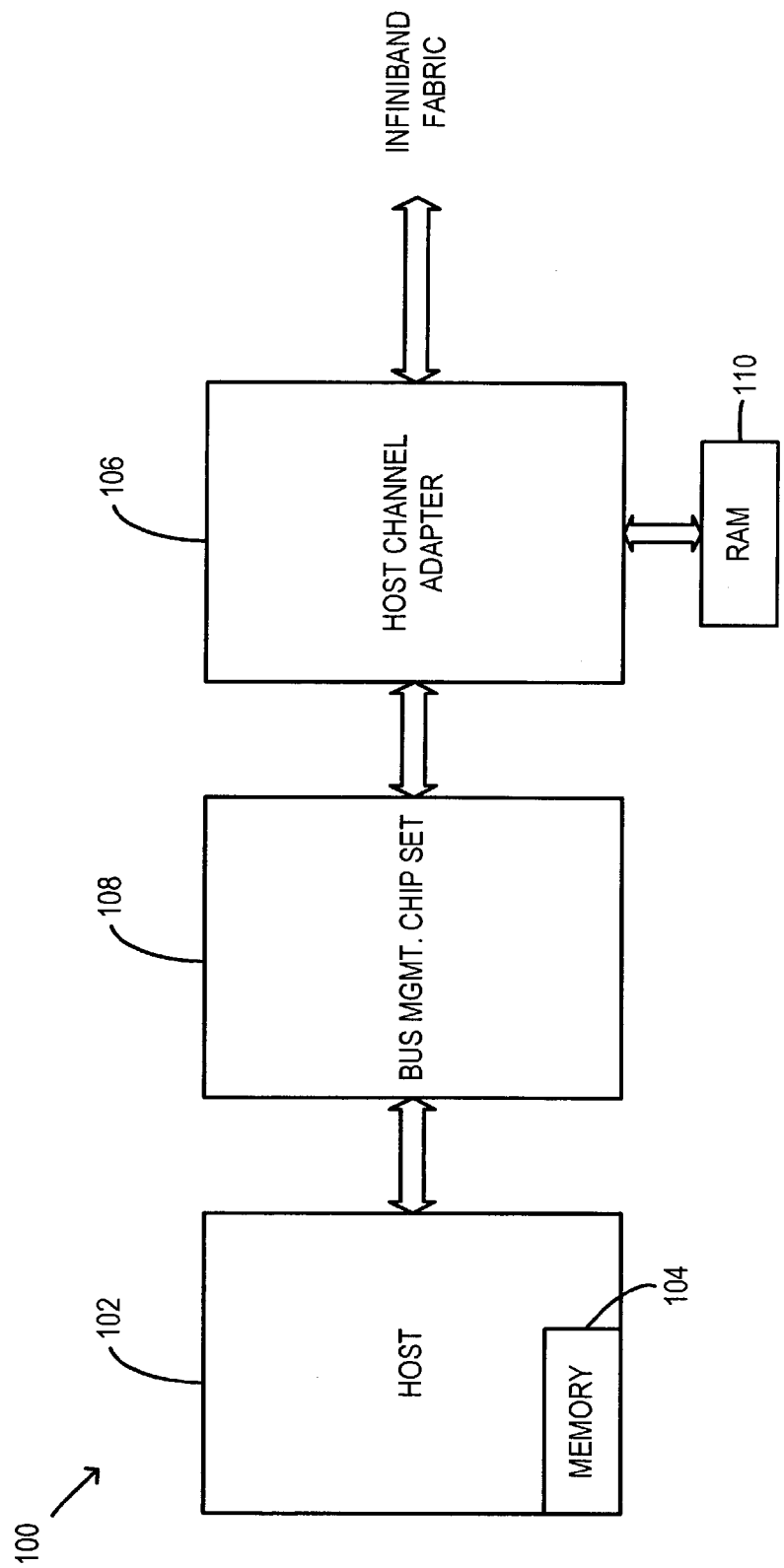
FIG. 1 is a block diagram that illustrates a data processing system provided according to some embodiments.

FIG. 1 is a block diagram that illustrates a data processing system 100 that may be provided according to some embodiments. The data processing system 100 may generally conform to the well-known Infiniband architecture which has been proposed for providing input and output to and from computer systems.

The data processing system 100 includes a host system 102, which may be a server computer, for example, and may comprise one or more processors and related components (which are not separately shown except for system memory 104 that is included in the host system 102).

The data processing system 100 also includes a host channel adapter 106 which is coupled to the host system 102 via a bus management chip set 108. A side memory 110 (e.g., RAM (random access memory)) is coupled to the host channel adapter 106. The host channel adapter serves to provide an input/output connection between the host system 102 and other data processing devices via an Infiniband fabric such as a switch (not separately shown) or another host channel adapter for another host system.

Figure 2:
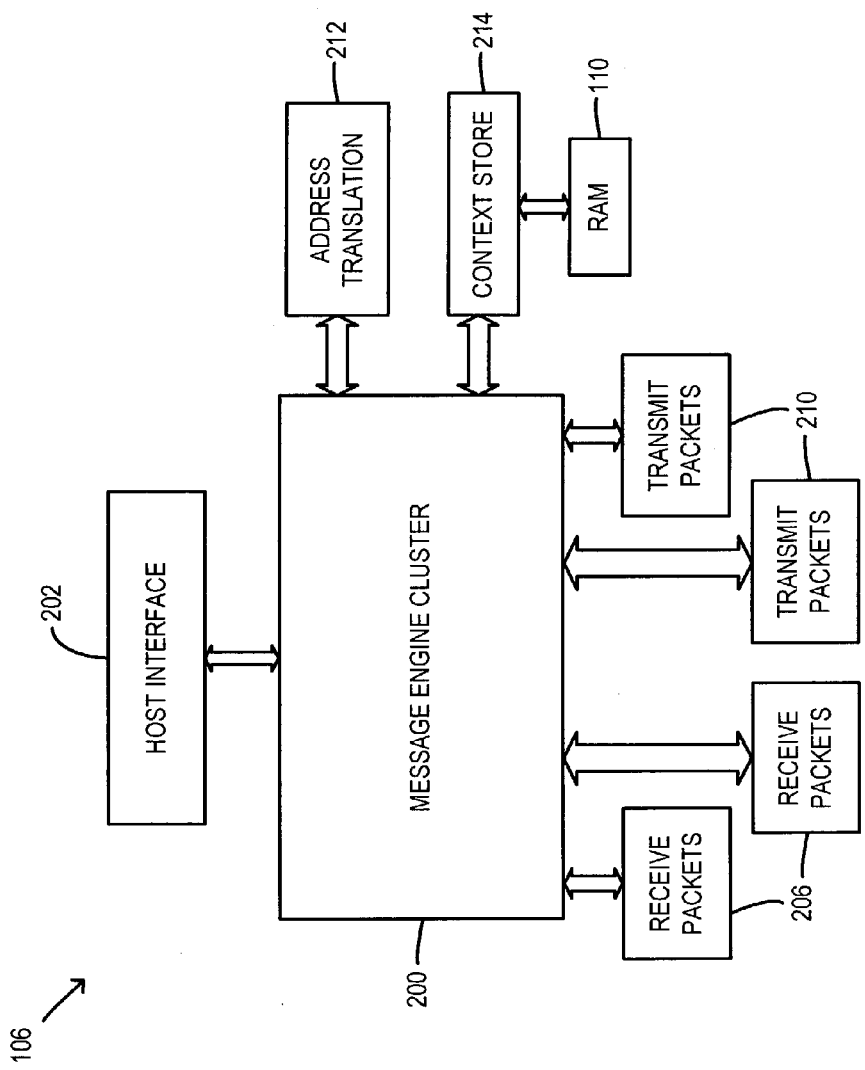
FIG. 2 is a simplified block diagram illustration of a host channel adapter that is part of the data processing system of FIG. 1.

FIG. 2 is a block diagram that illustrates some aspects of the host channel adapter 106. As illustrated in FIG. 2, the host channel adapter includes a message engine cluster 200 that generally handles receipt of incoming data packets and transmission of outbound data packets. A host interface 202 couples the message engine cluster 200 to the bus management chip set 108 (FIG. 1) and ultimately to the host system 102. In an inbound data path, receive packet clusters 206 couple the message engine cluster 200 to the Infiniband fabric. The receive packet clusters manage incoming data packets. In an outbound data path, the message engine cluster 200 is coupled to the Infiniband fabric via transmit packet clusters 210, which manage outbound data packets.

The host channel adapter 106 also includes an address translation cluster 212 which is coupled to the message engine cluster 200 and which handles translation of virtual memory addresses, with which the message engine cluster operates, into physical memory addresses for the system memory 104 (FIG. 1). Also included in the host channel adapter 106 is a context store cluster 214 which manages storage in the side memory 110 of queue context information that is used to manage receive and send queues that are serviced by the message engine cluster 200. (The side memory 110 is separate from but coupled to the host channel adapter 106 and is shown in both FIGS. 1 and 2. The host channel adapter may, in some embodiments, be implemented as an application specific integrated circuit (ASIC).)

Figure 3:
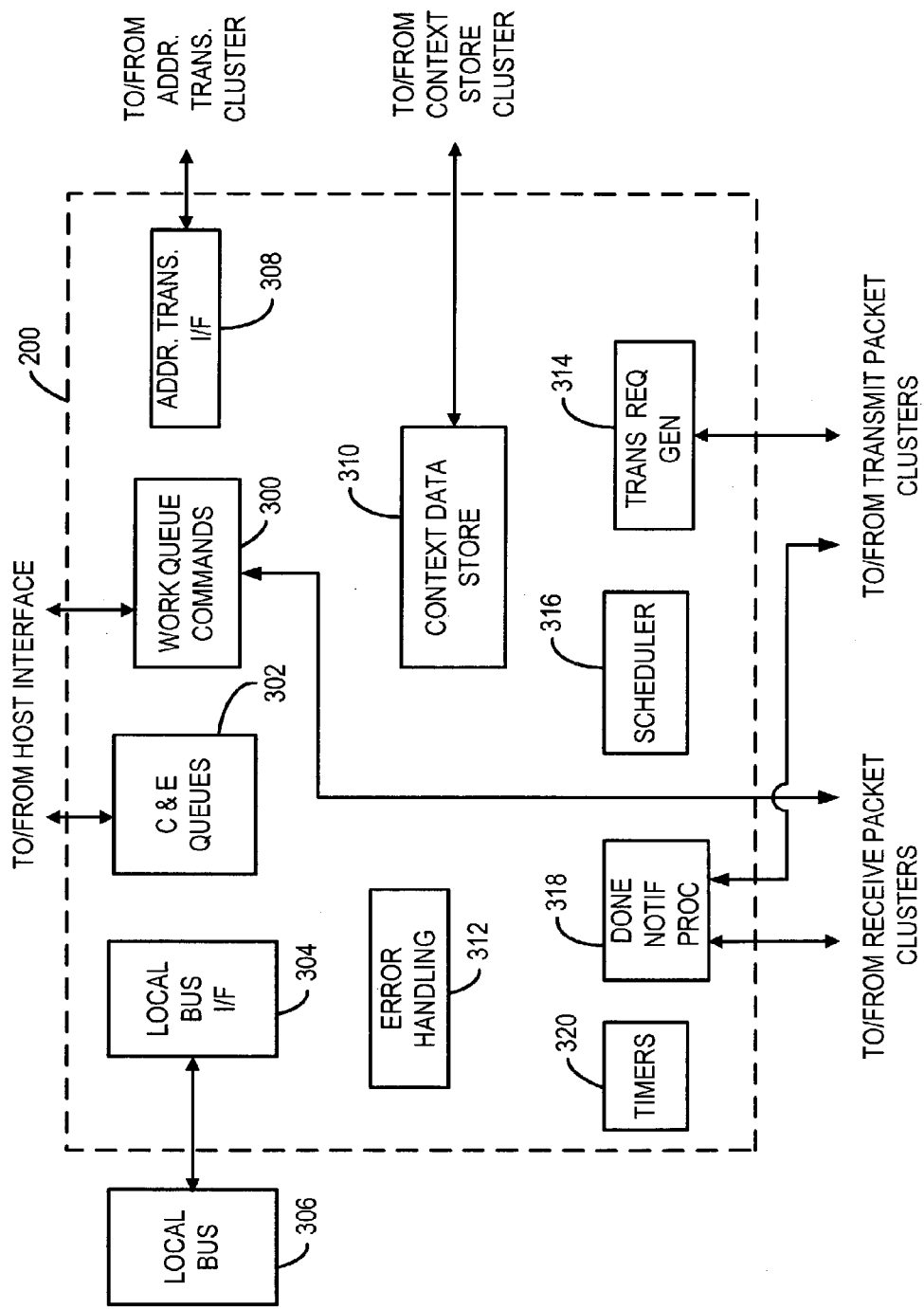
FIG. 3 is a simplified block diagram illustration of a message engine cluster that is part of the host channel adapter of FIG. 2.

FIG. 3 is a block diagram that illustrates some features of the message engine cluster 200. As illustrated in FIG. 3, the message engine cluster 200 includes a work queue command block 300 which services receive and send queues. The work queue command block is coupled to the host interface 202 (FIG. 2) and to the receive packet clusters 206. The message engine cluster also includes a completion and event queue block 302 which is coupled to the host interface 202 and which services completion and event queues.

Also included in the message engine cluster 200 is a local bus interface 304 which couples the message engine cluster to a local bus 306 of the host channel adapter 106. The local bus 306 interconnects all of the clusters of the host channel adapter and may be used, among other purposes, for inputting configuration information to the message engine cluster 200 via the local bus interface 304.

The message engine cluster 200 also includes an address translation interface 308 which couples the message engine cluster to the address translation cluster 212 (FIG. 2), and a context data store block 310 which interfaces the message engine cluster to the context store cluster 214. Also included in the message engine cluster is an error handling block 312. The error handling block 312 is a micro-engine that handles error conditions and accesses the side memory 110 (FIG. 2).

The message engine cluster 200 also includes a transmit request generator 314 which is coupled to the transmit packet clusters 210 (FIG. 2) and which initiates transmission of outbound data packets by the packet transmit clusters. The message engine cluster also includes a scheduler block 316. The scheduler block 316 sets an order in which tasks (including servicing of receive and send queues) are performed by the message engine cluster.

Also included in the message engine cluster 200 is a done notification processor 318. The done notification processor is coupled to, and receives "done" notifications from, the receive packet clusters 206 and the transmit packet clusters 210. The done notification processor coordinates final tasks for packet message completions.

Finally, the message engine cluster 200 also includes a timers block 320. The timers block includes timers for indicating time-out conditions with respect to various functions of the message engine cluster. Timers of the timers block are allocated to queue pairs (each consisting of a receive queue and a send queue) based on activity of the queue pair.

To simplify the drawing, FIG. 3 omits interconnections among the blocks which make up the message engine cluster 200. However, those interconnections will now be described.

The work queue command block 300 is coupled for two-way communication with the error handling block 312, the transmit request generator 314, the context data store block 310 and the address translation interface 308.

The completion and event queue block 302 is coupled to receive communication from the local bus interface 304 and is coupled for two-way communication with the error handling block 312, the done notification processor 318, the context data store block 310 and the address translation interface 308.

The local bus interface 304 is coupled to send communication to the completion and event queue block 302 and to the scheduler block 316. The local bus interface 304 is also coupled for two-way communication with the error handling block 312.

The address translation interface 308 is coupled to send communication to the done notification processor 318 and is also coupled for two-way communication with the completion and event queue block 302, the error handling block 312 and the transmit request generator 314.

The context data store block 310 is coupled for two-way communication with the work queue command block 300, the completion and event queue block 302, the error handling block 312, the done notification processor 318, the scheduler block 316 and the transmit request generator 314.

The error handling block 312 is coupled for two-way communication with the local bus interface 304, the address translation interface 308, the completion and event queue block 302, the work queue command block 300, the context data store block 310, the done notification processor 318, the scheduler block 316, the transmit request generator 314 and the timers block 320.

The transmit request generator 314 is coupled to send communication to the address translation interface 308 and is also coupled for two-way communication with the context data store block 310, the error handling block 312, the work queue command block 300 and the scheduler block 316.

The scheduler block 316 is coupled to receive communication from the local bus interface 304. The scheduler block 316 is also coupled for two-way communication with the error handling block 312, the context data store block 310 and the transmit request generator 314.

The done notification processor 318 is coupled to receive communication from the address translation interface 308 and is also coupled for two-way communication with the context data store block 310, the timers block 320, the error handling block 312 and the completion and event queue block 302.

The timers block 320 is coupled for two-way communication with the error handling block 312 and the done notification processor 318.

Significant functions of the host channel adapter 106 are governed by queues that are managed by the message engine cluster 200. Some of these queues are referred to as "work queues". Work queues may be either receive queues, which correspond to incoming data messages, or send queues, which correspond to outbound data messages. Each work queue is made up of entries called work queue elements (WQEs), each of which represents a task to be performed by the host channel adapter 106. Such tasks may be handling an incoming data message or transmitting an outbound data message. Performing a task represented by a WQE may be referred to as "servicing" the WQE. Servicing of WQEs is overseen by the work queue command block 300 (FIG. 3).

Work queues are arranged in queue pairs, each of which corresponds to a data channel and consists of a receive queue and a send queue. For each queue pair there is a queue pair context (QPC) stored in the side memory 110. Each QPC stores data which is used in servicing the queues which make up the corresponding queue pair. Further details of the data stored in the QPCs are provided below.

The work queues themselves are stored in the system memory 104. In some embodiments there may be thousands of work queues, corresponding to thousands of queue pairs, for each of which a respective QPC is stored in the side memory 110.

Completion queues and an event queue are also managed by the message engine cluster 200. Each completion queue corresponds to a queue pair or a group of queue pairs and contains entries that indicate completion of work for the corresponding queue pair or group of queue pairs.

One event queue is maintained for the host channel adapter. Entries in the event queue may represent global events for the host channel adapter such as interrupt requests.

The entries which make up the completion and event queues are stored in the system memory 104 (FIG. 1). Servicing of completion and event queue entries is overseen by the completion and event queue block 302 (FIG. 3).

Figure 4:
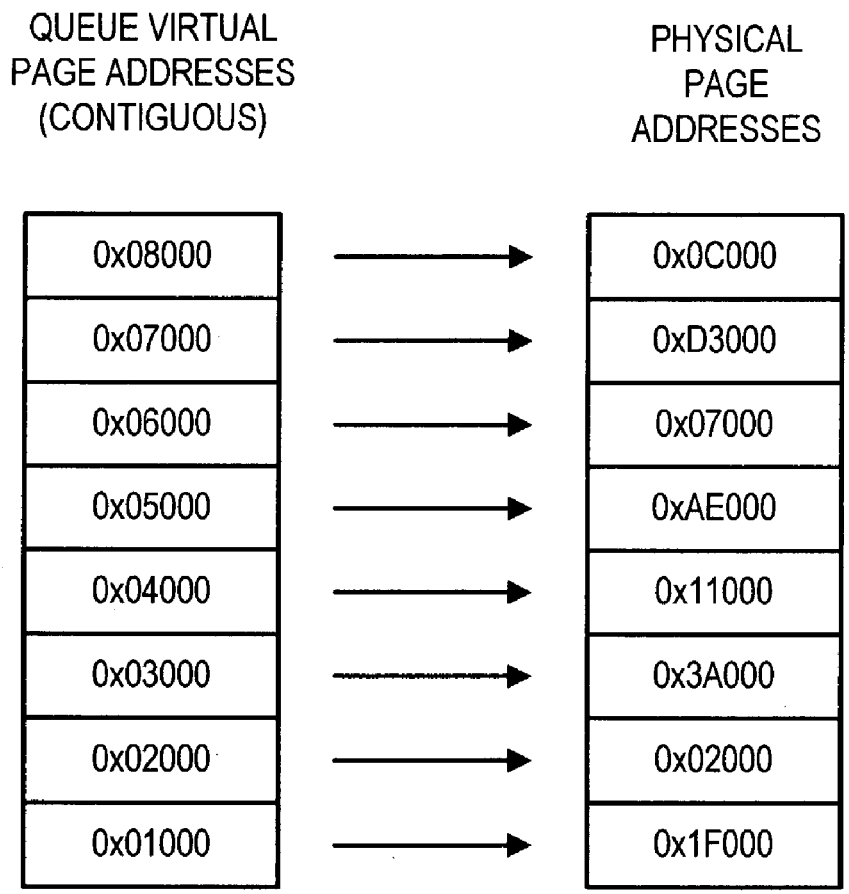
FIG. 4 schematically illustrates an example mapping of virtual memory pages for a queue into physical memory pages, as may be provided in connection with the host channel adapter of FIG. 2.

In managing the work queues, the completion queues and the event queue, the work queue command block 300 or the completion and event queue block 302, as the case may be, may employ virtual memory addresses so that sizable contiguous memory blocks are available for each queue. Each queue may extend over one or more virtual memory pages. However, contiguous virtual memory pages may be mapped to physical memory pages in the system memory 104 that are not contiguous. FIG. 4 schematically illustrates an example of this phenomenon. For the example shown in FIG. 4, the page size is assumed to be 4K.

The address translation cluster 212 (FIG. 2) handles translation of virtual memory page addresses to physical memory page addresses. Because of the possible discontinuity of the physical memory pages in which a queue is stored, it is necessary to perform virtual memory to physical memory page address translation on each occasion during servicing of a queue when a page boundary is reached or when the end of the queue is reached. Address translation may have the potential for significant latency since an address translation operation may entail looking up data that is stored in the system memory 104. To minimize or eliminate delays at page crossings and at "wrap around" from the end of a queue back to the head of the queue, some embodiments employ a "look ahead" function so that an address translation for the next page or the first page of the queue is "pre-fetched" while the entry at the end of the previous page or at the end of the queue is being serviced. This pre-fetching may be referred to as "pre-translation".

Figure 5:
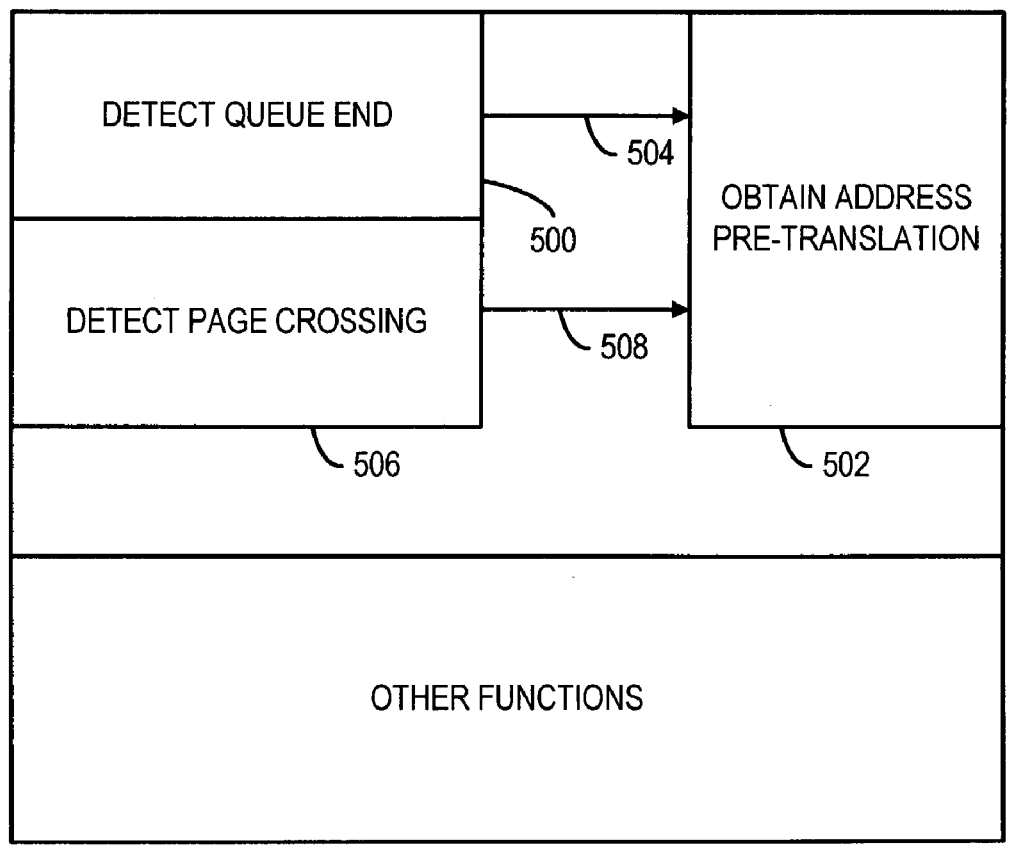
FIG. 5 is a block diagram that illustrates some features that may be present in queue handling blocks of the message engine cluster of FIG. 3.

FIG. 5 is a block diagram that schematically illustrates a circuit arrangement that may be present in some embodiments in either or both of the work queue command block 300 and the completion and event queue block 302 of the message engine cluster 200 (FIG. 3). Referring to FIG. 5, a queue end detection logic circuit 500 is provided to detect when the queue entry currently being accessed for servicing is the last entry in the queue. In the case of a work queue, the queue end may be detected by determining whether the WQE number of the WQE currently being serviced is one less than the total number of WQEs contained in the work queue (this assumes that the first WQE in the queue is number "0"). In the case of a completion or event queue, the queue end may be detected by determining whether the write index for the currently serviced entry plus one equals the queue size. It may also be desirable in such cases to determine whether the entire queue fits within one memory page, in which case no address pre-translation is required.

In some embodiments, the detection of the queue end may be based on an offset of the entry currently being serviced.

The circuit arrangement of FIG. 5 also includes a logic circuit 502 that is configured to initiate pre-translation of the virtual address of the memory page for the next queue entry to be serviced after the queue entry that is currently being serviced. If the logic circuit 500 detects that the queue entry currently being serviced is the last entry in the queue, the logic circuit 500 provides an output signal indicated at 504 to the logic circuit 502. In response to the output signal 504, the logic circuit 502 communicates with the address translation cluster 212 (FIG. 2) via the address translation interface 308 (FIG. 3) to initiate pre-translation of the virtual memory address of the head of the queue into the corresponding physical memory address while the entry at the end of the queue is being serviced. Once the servicing of the entry at the end of the queue and the pre-translation of the virtual memory address of the head of the queue are complete, the entry at the head of the queue may be serviced using the physical memory address obtained by the pre-translation operation which was stored in the RAM 110. Potential latency involved in the translation of the virtual memory address of the head of the queue is partially or completely hidden, thereby reducing or eliminating delay in "queue wrap" situations.

Continuing to refer to FIG. 5, the circuit arrangement shown therein also includes a page crossing detection logic circuit 506. The page crossing detection logic circuit 506 is provided to detect when the queue entry currently being accessed for servicing is the last entry of a virtual memory page of the queue. In the case of a work queue, the page crossing detection logic circuit 506 may access the queue pair context for the queue pair that includes the work queue to determine the size of the virtual memory pages in the work queue. The page crossing detection logic circuit 506 may then examine the low order bits of the number of the WQE currently being processed to determine whether the low order bits are all "1". The number of low order bits to be examined may be indicated by the page size for the work queue. The number of low order bits to be examined may also be determined based in part on the size of the WQEs in the work queue. This information may be obtained by accessing the QPC for the work queue.

In the case of a completion queue or event queue, the page crossing detection logic circuit 506 may examine whether the low order bits of the write index for the entry currently being serviced are all "1", which would indicate that the entry is the last entry in the page. The number of low order bits to be examined may be determined based on the page size for the queue.

In some embodiments, detection of a page crossing may be based on an offset for the entry that is currently being serviced.

If the logic circuit 506 detects that the queue entry currently being serviced is the last entry in a page, the logic circuit 506 provides an output signal indicated at 508 to the logic circuit 502. In response to the output signal 508, the logic circuit 502 communicates with the address translation cluster 212 (FIG. 2) via the address translation interface 308 (FIG. 3) to initiate pre-translation of the virtual memory address of the next page of the queue into the corresponding physical memory address while the entry at the end of the current page is being serviced. Once the servicing of the entry at the end of the current page and the pre-translation of the virtual memory address of the next page are complete, the initial entry of the next queue page may be serviced using the physical memory address obtained by the pre-translation operation which was stored in the RAM 110. Potential latency involved in the translation of the virtual memory address of the next queue page is partially or completely hidden, thereby reducing or eliminating delay in page crossing situations.

The logic circuit arrangement of FIG. 5 also includes other logic circuitry, indicated at 510, to perform other functions of the work queue command block 300 or the completion and event queue block 302, as the case may be. Such other functions may include servicing entries of the queues.

In some embodiments, each QPC may include at least the following parameter data:

Base translation index—27 bits.
Page size—2 bits.
Number of WQEs in receive queue—9 bits.
Number of WQEs in send queue—9 bits.
Current physical page address for receive queue—52 bits.
Current physical page address for send queue—52 bits.
Size of WQEs in receive queue—1 bit.
Size of WQEs in send queue—1 bit.
Current WQE number for receive queue—12 bits.
Current WQE number for send queue—12 bits.

The base translation index is used to translate from virtual memory space to physical memory space. The base translation index is an index to a look-up table (e.g., in the system memory 104) which provides the base physical memory address for the first queue of the queue pair. In some embodiments, the queue pair is arranged in virtual memory with the receive queue beginning at the base address in virtual and physical memory, and the send queue immediately following in virtual memory. The opposite arrangement, i.e., with the send queue first and the receive queue immediately following, may also be employed. It is also not required that the send queue and the receive queue be contiguous. As another alternative, all of the queuing could be contiguous, including all send, receive, completion and event queues, with respective offsets for each queue. Other arrangements are also possible.

The two bits that encode the page size for the queue pair may indicate, in some embodiments, one of the following page sizes: 4K, 8K or 16K, with the fourth possible value being reserved. In some embodiments, the queue page size must not exceed the physical memory page size.

The nine bit "number of WQEs" parameter indicates the total number WQEs in the receive queue or the send queue, as the case may be. For example, the actual number stored for this entry may be one-eighth of the actual total number of WQEs in the receive queue or in the send queue.

The 52 bit "current physical page address" parameter indicates the base physical page address for the current virtual queue page for the receive queue or the send queue, as the case may be. In some embodiments, all 52 bits may not be required.

The one bit "size of WQEs" parameter indicates the size of each WQE in the receive queue or the send queue, as the case may be. In some embodiments, this parameter may indicate a WQE size of either 128 bytes (one line) or 256 bytes (two lines).

The 12 bit "current WQE number" parameter indicates the number of the WQE currently being processed in the receive queue or the send queue, as the case may be. In some embodiments, the first WQE in the queue is given the number "0".

A QPC provided in this manner may be advantageous in that storing of certain data such as WQE size and page size may make it unnecessary to store other data, such as page numbers. Because offsets may be calculated based on parameter data in the QPC, the amount of data stored in the QPC may be reduced. Given that thousands of QPCs may be stored in the side memory 110, a reduction of the amount of data in each QPC may permit a worthwhile economy in the size of the side memory 110.

Another advantage of the QPC described above is that different queue pairs may have different virtual page sizes and/or the receive queue and the send queue of a queue pair may have different queue page sizes.

Figure 6:
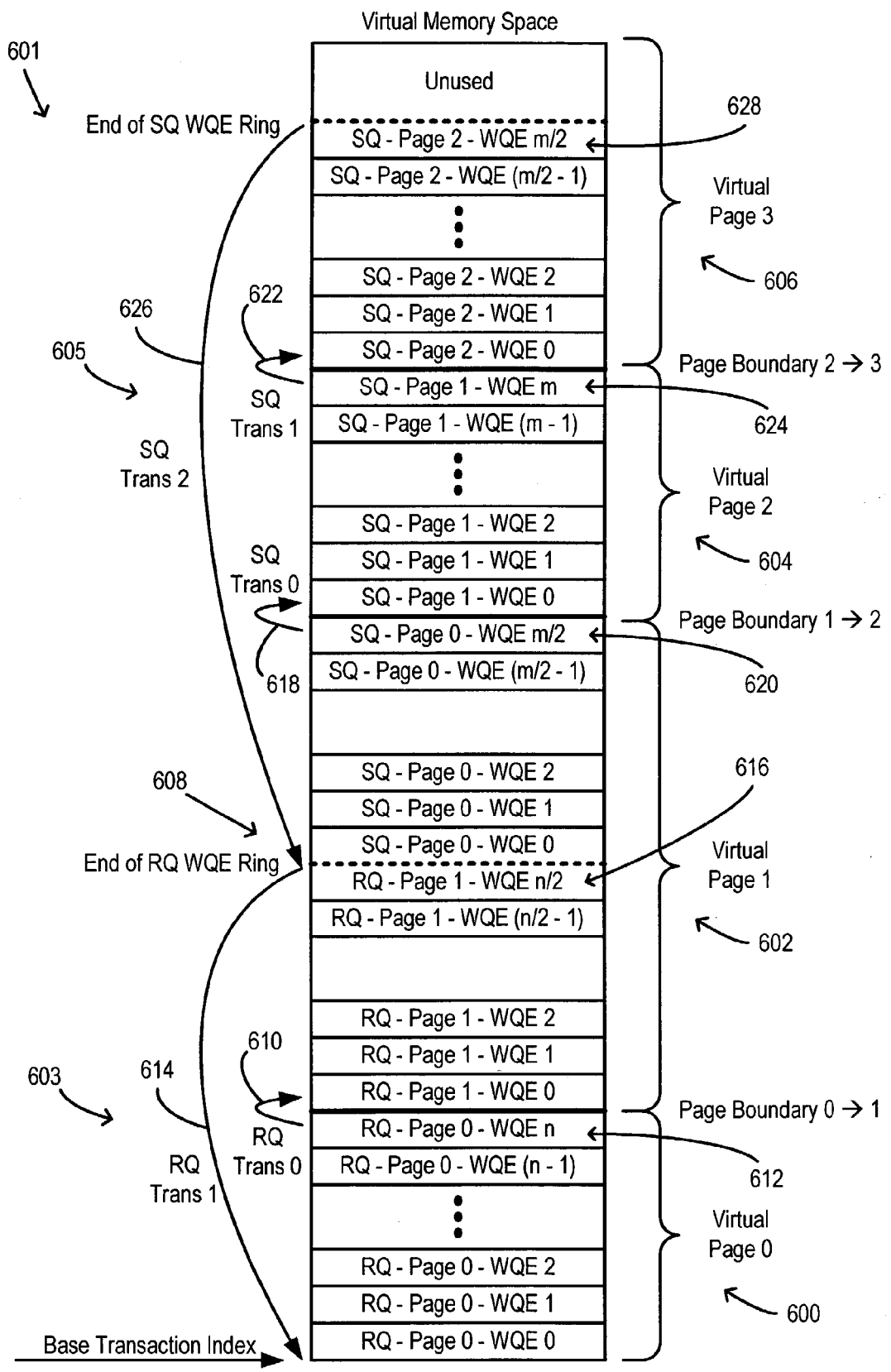
FIG. 6 schematically illustrates an example arrangement and handling of a work queue pair in virtual memory space by a block of the message engine cluster of FIG. 3.
Figure 7:
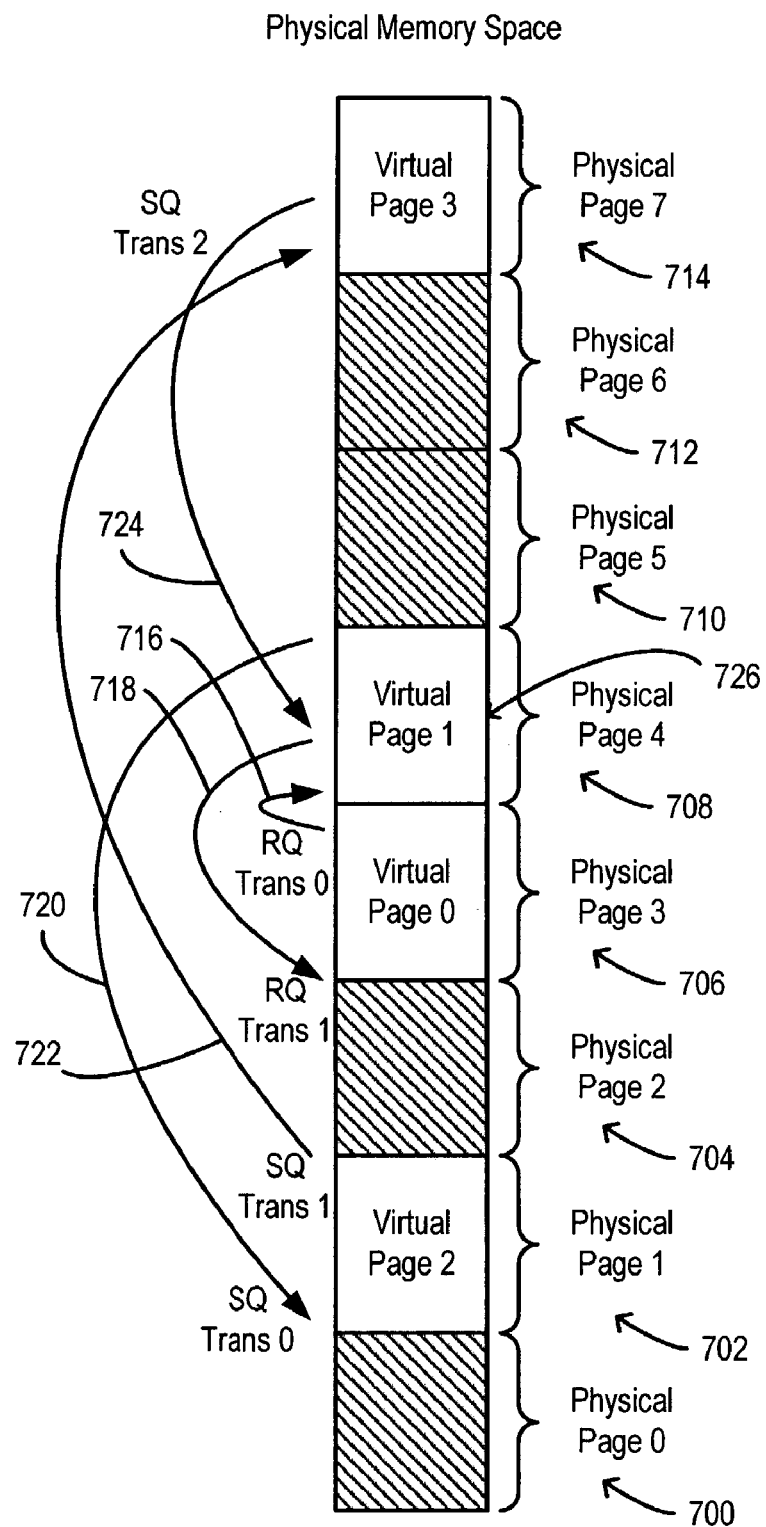
FIG. 7 schematically illustrates the example arrangement and handling of the work queue pair of FIG. 6 as performed in physical memory space.

FIG. 6 is a schematic representation of an example arrangement of a queue pair 601 (receive queue 603 and send queue 605) in virtual memory space. FIG. 7 is to be considered with FIG. 6, and is a schematic representation of how the virtual memory pages shown in FIG. 6 may be mapped to physical memory pages according to one example.

In the example illustrated in FIG. 6, four virtual memory pages are represented, indicated as "virtual memory page 0" (reference numeral 600), "virtual memory page 1" (reference numeral 602), "virtual memory page 2" (reference numeral 604), and "virtual memory page 3" (reference numeral 606).

In the example of FIG. 6, the receive queue 603 begins at the start of virtual page 0 and continues to a midpoint 608 of virtual page 1, where the receive queue 603 ends. The send queue 605 begins immediately after the end of the receive queue 603, i.e, at the midpoint of virtual page 1, and continues for the balance of virtual page 1, entirely through virtual page 2 and midway through virtual page 3.

FIG. 7 schematically illustrates eight physical memory pages, indicated respectively as "physical page 0" through "physical page 7" (reference numerals 700–714). In FIG. 7 the virtual pages of FIG. 6 are shown discontinuously mapped among some of the physical pages 0 through 7. In particular, virtual page 0 is mapped to physical page 3 in this example; virtual page 1 is mapped to physical page 4; virtual page 2 is mapped to physical page 1; and virtual page 3 is mapped to physical page 7.

For the purposes of this example, it is assumed that the size of the virtual pages and of the WQEs is such that there are n receive queue WQEs in each virtual page, and there are m send queue WQEs in each virtual page. It may, but need not, be the case that n=m.

Considering receive queue 601 as shown in FIG. 6, it will be observed that a page crossing occurs in the receive queue at the end of virtual page 0, as indicated by a transition 610. In some embodiments, a pre-fetch of the physical memory address for the next virtual page (virtual page 1) occurs while the last WQE ("RQ-Page 0-WQE n"; reference numeral 612) in virtual memory page 0 is being serviced. More specifically, the address of virtual page 1 is pre-translated to the address for physical page 4, and the corresponding transition is indicated at 716 in FIG. 7.

Referring again to FIG. 6, another transition, indicated at 614, occurs at the end of the receive queue 603. That is, a pre-fetch of the physical memory address for virtual page 0 occurs while the last WQE ("RQ-Page 1-WQE n/2"; reference numeral 616) of the receive queue is being serviced. This transition is also indicated at 718 in FIG. 7.

Continuing to refer to FIG. 6, and considering now the send queue 605, it will be observed that a page crossing occurs in the send queue at the end of virtual page 1, as indicated by a transition 618. In this transition, a pre-fetch of the physical memory address for virtual page 2 occurs while the last WQE ("SQ-Page 0-WQE m/2"; reference numeral 620) of virtual page 1 is being serviced. This transition is indicated at 720 in FIG. 7, and yields the address for physical page 1.

Again referring to FIG. 6, another page crossing occurs in the send queue at the end of virtual page 2, as indicated by a transition 622. In this transition, a pre-fetch of the physical memory address for virtual page 3 occurs while the last WQE ("SQ-Page 1-WQE m"; reference numeral 624) of virtual page 2 is being serviced. This transition is indicated at 722 in FIG. 7 and yields the address for physical page 7.

Continuing to refer to FIG. 6, another transition, indicated at 626, occurs at the end of the send queue 605. In this transition, a pre-fetch of the physical memory address for virtual page 1 occurs while the last WQE ("SQ-Page 2-WQE m/2"; reference numeral 628) of the send queue is being serviced. This transition is also indicated at 724 in FIG. 7. After this transition, the work queue command block 300 applies an appropriate offset to indicate the midpoint 608 of the virtual page 1 (corresponding to a midpoint 726 of physical page 4, FIG. 7) as the address of the next send queue WQE (head of the send queue) to be serviced. The work queue command block 300 is able to determine that such an offset is appropriate based on the queue page size, total number of WQEs and WQE size for the receive queue 603.

The example arrangement shown in FIGS. 6 and 7, in which the send queue begins immediately after the receive queue even if the receive queue ends in the middle of a page, is advantageous in that it promotes efficient use of physical memory and avoids wastage of physical memory resources that would otherwise occur if the send queue were only permitted to begin at a page boundary. This saving of physical memory may be significant given that a large number of queue pairs (e.g. thousands) may be stored in the system memory 104. It should be understood that the same advantage could be obtained by placing the send queue first in the queue pair and starting the receive queue immediately after the end of the send queue.

Figure 8:
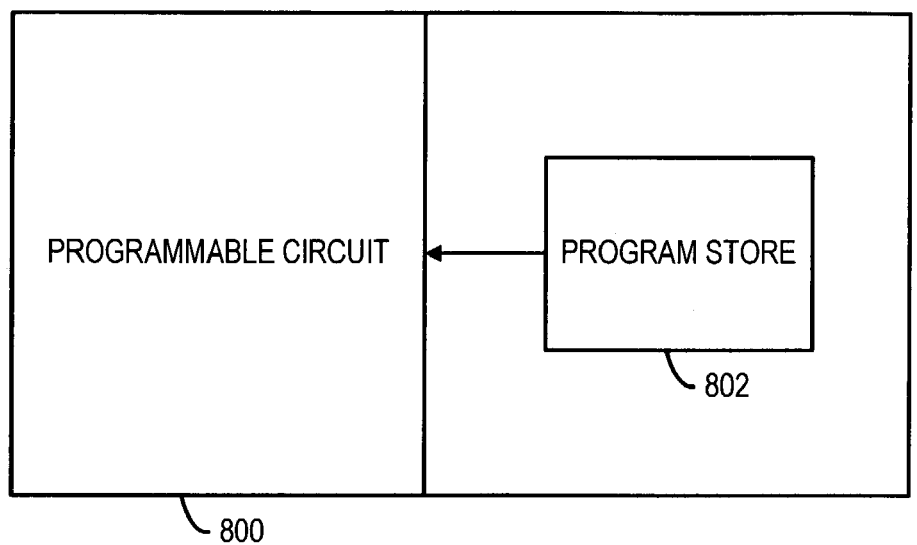
FIG. 8 is a block diagram of features that may be present in one or more blocks of the message engine cluster according to some alternative embodiments.

In some embodiments, at least some of the pre-fetch functionality of the message engine cluster 200 may be implemented using micro-code. For example, one or both of the work queue command block 300 and the completion and event queue block 302 may include a circuit arrangement such as that illustrated in FIG. 8. In the circuit arrangement of FIG. 8, a programmable circuit 800 is provided and is controlled by micro-code stored in a program store 802.

Figure 9:
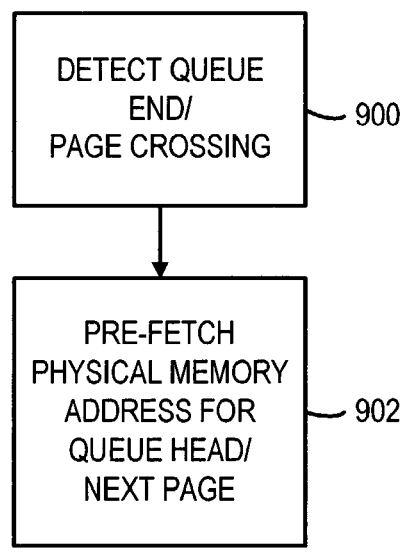
FIG. 9 is a flowchart that illustrates a process that may be implemented in the circuitry of FIG. 8.

FIG. 9 is a flowchart that illustrates a process that the programmable circuit 800 performs under control by the micro-code stored in the program store 802. At 900, the end of a queue or a queue page-crossing is detected. At 902, and responsive to the detection of the queue end or page crossing, the physical memory address for the queue head or for the next queue page is pre-fetched (i.e. the virtual memory page address for the queue head or the next queue page is pre-translated into the corresponding physical memory address) while the last entry in the queue or the last entry in the queue page is being serviced.

The above embodiments have been described in the context of a host channel adapter provided in accordance with the Infiniband architecture, but some or all of the novel features described herein may also be embodied in other contexts, including network processors for other input/output or other data communication protocols.

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. A method comprising:
   detecting an end of a first queue page; and
   pretranslating a virtual memory address of a next queue page into a physical memory address while servicing an entry of the first queue page;
   wherein:
   the detecting includes accessing data indicative of a size of the first queue page; and
   the first queue page is part of a receive queue or a send queue, and the accessing includes accessing data included in a queue pair context for the receive queue or send queue.

2. The method of claim 1, wherein the entry is at the end of the first queue page.

3. The method of claim 1, further comprising: servicing an initial entry of the next queue page using the physical memory address.

4. The method of claim 1, wherein the detecting is based on an offset of the entry.

5. The method of claim 1, wherein the detecting includes accessing data indicative of a size of a queue entry.

6. A method comprising:
   detecting an end of a queue; and
   pre-translating a virtual memory address of a head of the queue into a physical memory address while servicing an entry a the end of the queue;
   wherein:
   the detecting includes accessing data indicative of a size of the queue; and
   the queue is a receive queue or a send queue, and the accessing includes accessing data included in a queue pair context for the receive queue or send queue.

7. The method of claim 6, further comprising:
   servicing an entry at the head of the queue using the physical memory address.

8. The method of claim 6, wherein the detecting is based on an offset of the entry.

9. The method of claim 6, wherein the data is indicative of at least one of a size of entries in the queue and a total number of entries in the queue.

10. An apparatus comprising:
    a first circuit configured to service an entry of a first queue page;
    a second circuit configured to detect an end of the first queue page; and
    a third circuit responsive to the second circuit and configured to obtain a pre-translation of a virtual memory address of a next queue page into a physical memory address while the first circuit is servicing the entry;
    wherein:
    the first queue page is part of a receive queue or a send queue; and
    the second circuit is operative to access data indicative of a size of the first queue page, said data included in a queue pair context for the receive queue or send queue.

11. An apparatus comprising:
    a first ciruit configured to service entries of a queue;
    a second circuit configured to detect an end of the queue; and
    a third circuit responsive to the second circuit and configured to obtain a pre-translation of a virtual memory address of a head of the queue into a physical memory address while the first circuit is servicing and entry at the end of the queue;
    wherein;
    the queue is a receive queue or a send queue; and
    the second circuit is operative to access data indicative of a size of the queue, said data included in a queue pair context for the receive queue or send queue.

12. An apparatus comprising:
    first means for servicing an entry of a first queue page;
    second means for detecting an end of the first queue page; and
    third means, responsive to the second means, for obtaining a pre-translation of a virtual memory address of a next queue page into a physical memory address while the first means is servicing the entry;
    wherein:
    the first queue page is part of a receive queue or a send queue; and
    the second means is operative to access data indicative of a size of the first queue page, said data included in a queue pair context for the receive queue or send queue.

13. An apparatus comprising:
    first means for servicing entries of a queue;
    second means for detecting an end of the queue; and
    third means, responsive to the second means, for obtaining a pre-translation of a virtual memory address of a head of the queue into a physical memory address while the first means is servicing an entry at the end of the queue;
    wherein:
    the queue is a receive queue or a send queue; and
    the second means is operative to access data indicative of a size of the queue, said data included in a queue pair context for the receive queue or send queue.

14. An article of manufacture comprising:
    a computer usable medium having computer readable program code means embodied therein for managing a queue, the computer readable program code means in said article of manufacture comprising:
    computer readable program code means for detecting an end of a first queue page; and
    computer readable program code means for initiating a pre-translation of a virtual memory address of a next queue page into a physical memory address, the pre-translation occurring while an entry of the first queue page is being serviced;
    wherein:
    the first queue page is part of a receive queue or a send queue; and the computer readable program code means for detecting the end of the first queue page is operative to access data indicative of a size of the first queue page, said data included in a queue pair context for the receive queue or send queue.

15. An aricle of manufacture comprising:

a computer usable medium having computer readable program code means embodied therein for managing a queue, the computer readable program code means in said article of manufacture comprising:

computer readable program code means for detecting an end of a queue; and computer readable program code means for initiating a pre-translation of a virtual memory address of a head of the queue into a physical memory address, the pre-translation occurring while an entry at the end of the queue is being serviced;

wherein:

the queue is a receive queue or a send queue; and the computer readable program code means for detecting the end of the queue is operative to access data indicative of a size of the queue, said data included in a queue pair context for the receive queue or send queue.

* * * * *